US008539499B1

(12) United States Patent
Tovpeko et al.

(10) Patent No.: US 8,539,499 B1
(45) Date of Patent: Sep. 17, 2013

(54) SYMMETRIC MULTIPROCESSING WITH VIRTUAL CPU AND VSMP TECHNOLOGY

(75) Inventors: Sergei V. Tovpeko, Moscow (RU); Alexey B. Koryakin, Moscow (RU); Andrey A. Omelyanchuk, Moscow (RU); Alexander G. Tormasov, Moscow (RU); Nikolay N. Dobrovolskiy, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 1216 days.

(21) Appl. No.: 12/032,991

(22) Filed: Feb. 18, 2008

(51) Int. Cl.
*G06F 9/46* (2006.01)
*G06F 11/00* (2006.01)

(52) U.S. Cl.
USPC ............... 718/104; 718/107; 714/17; 714/19

(58) Field of Classification Search
USPC ............................................. 717/126; 718/1
See application file for complete search history.

(56) References Cited

U.S. PATENT DOCUMENTS

| | | | | |
|---|---|---|---|---|
| 5,892,944 A * | 4/1999 | Fukumoto et al. | ............ | 718/100 |
| 5,898,855 A * | 4/1999 | Onodera et al. | .................. | 718/1 |
| 6,052,756 A * | 4/2000 | Barnaby et al. | ............... | 711/105 |
| 7,069,413 B1 * | 6/2006 | Agesen et al. | ................. | 711/207 |
| 7,434,002 B1 * | 10/2008 | Zedlewski et al. | ............ | 711/130 |
| 2006/0005190 A1* | 1/2006 | Vega et al. | ......................... | 718/1 |
| 2007/0220492 A1* | 9/2007 | Brugiolo et al. | .............. | 717/126 |

* cited by examiner

*Primary Examiner* — Meng An
*Assistant Examiner* — Wissam Rashid
(74) *Attorney, Agent, or Firm* — Bardmesser Law Group (57) ABSTRACT

A system, method and computer program product, including a primary operating system (OS) having access to at least some hardware resources of the computer system. A Hypervisor controls a plurality of virtualization spaces and at least some of the remaining hardware resources. Each virtualization space maintains data of a corresponding instance of a Virtual Machine with a guest operating system running inside the Virtual Machine. Each Virtual Machine is associated with at least one virtual processor. A hyperswitch controlled by the Hypervisor starts and stops execution of the Virtual Machines. A scheduler dedicates a quantum of running time to each virtual processor. When the quantum is given to the Virtual Machine, the Hypervisor forces the hyperswitch to activate the Virtual Machine on its virtual processor.

20 Claims, 11 Drawing Sheets

SYMMETRIC MULTIPROCESSING WITH VIRTUAL CPU AND VSMP TECHNOLOGY

BACKGROUND OF THE INVENTION

1. Field of the Invention

The present invention relates to a computer system that allocates and schedules host operating system (OS) resources among Virtual Machine processes.

2. Description of the Related Art

Modern computer systems include a CPU that executes a number of different tasks and processes. The basic operating system of the computer concept includes "threads," and host OS typically uses thread scheduling mechanisms. Threads are given a certain priority, meaning that some threads take precedence over others. The major function of the CPU thread scheduler is to keep the thread with the highest priority running at all times (or at least most of the time), and, if there is more than one thread with the highest priority, deciding which thread to run for a time quantum. The quantum of time is a unit of time during which a thread can run without being preempted by another thread if another high priority thread becomes active. Thus, if the thread does not complete its tasks before its time quantum ends, the thread is preempted and the next waiting thread with the highest priority is dispatched for execution.

There are "root mode" and "non-root mode" implemented in processors with virtualization support. In the "root mode" instructions can have direct access to the real hardware and "root mode" executes instructions outside any virtualization environment. The "non-root mode" is intended for running virtual environments and Virtual Environments are isolated at least partially.

There are two well known VMM architectures: stand-alone VMM (so called "type I") and hosted VMM (so-called "type II"). The stand-alone VMM basically operates as a full-fledged operating system. It runs on the system level and creates Virtual Machines on user level. Such a VMM itself controls all hardware, and, similar to an operating system, requires device drivers for each hardware device. Virtual Machines use VMM services for communicating with actual hardware.

Another type of VMM is a type II VMM that runs as an application on top of an existing host operating system. It runs on a user level and creates Virtual Machines on the user level as well. Since the VMM does not have privileges to use direct execution in the native mode, it employs full binary translation for virtualization. The VMM uses host OS services for memory management, processor scheduling, hardware drivers, and resource management.

Another type of VMM is a hosted VMM runs simultaneously with an existing host OS. It coexists with the host OS on the system level and executes Virtual Machines on the non-root or user (referred to the case of lightweight hypervisor) level. The VMM and the host OS are able to independently, without being interrupted, issue any processor instruction and modify any aspect of the processor state. The hosted VMM uses the host OS services for memory management, processor scheduling, hardware drivers, and resource management.

Hypervisor-based VMMs combine the advantages of the prior art systems and eliminate major disadvantages. The Hypervisor runs on the system level and creates Virtual Machines on the user level. One of the Virtual Machines runs a so-called "primary OS" and has privileges to handle some of the hardware directly. Other Virtual Machines and the Hypervisor use the primary OS and its hardware drivers for communication with the actual hardware. At the same time, the Hypervisor employs efficient memory management, processor scheduling and resource management without the help of the primary OS. The advantages of the Hypervisor-based approach are high Virtual Machine isolation, security, efficient resource management and a small trusted Hypervisor footprint.

In a traditional scheme with Hypervisor, processor interrupts being generated by system calls force the processor to switch state to the kernel level. It is realized inside interrupt handler.

A Lightweight Hypervisor runs on the system level, and handles some of the low level hardware resources to help the VMM performs a more effective virtualization. For example, the Lightweight Hypervisor reloads the Interrupt Descriptor Table (IDT) and protects it from modification by the primary OS and the VMM. The primary OS and the VMMs are not allowed to modify IDT, and they are not allowed process interrupts independently. It further provides correct virtualization of interrupts. The Lightweight Hypervisor coexists in all address spaces (primary OS context and VMM contexts) and exclusively processes all hardware interrupts and exceptions. It is responsible for interrupt forwarding, context switching between the primary OS and VMMs, and efficient resource scheduling.

The Hypervisor can be implemented as a driver for the primary OS. It is activated after the first Virtual Machine starts and is deactivated after the last Virtual Machine stops (alternatively, it might never be deactivated and will stay active until host OS reboot). Alternatively, the Hypervisor can be a separate, independently-loaded binary file.

After activation, the Lightweight Hypervisor can load its own IDT instead of the primary OS IDT, and takes control over all interrupts and exceptions. The Hypervisor protects its IDT against writes, and controls all attempts of the primary OS and of its subsystems to write to the IDT.

The Lightweight Hypervisor is co-resident in the primary OS and all VMM address spaces and handles all interrupts in all contexts. The Hypervisor is responsible for forwarding interrupts to the primary OS and VMMs. The Hypervisor detects primary OS' and its subsystems' write access to the IDT and maintains an interrupt subscription list for primary OS components.

Described above VMM/Hypervisor (referred later as "Lightweight Hypervisor") based on virtual systems are shown for exemplary goals only. Invention can be also used with other types of virtual systems where present mechanism of at least partial handling resources.

In Hypervisor-based VMMs, the virtualization system is divided into two parts:

(a) A Hypervisor, which allows at least partially handling of hardware resources and low level software resources and events to provide more effective integration with primary OS, or with a primary OS service that allows communication with hardware in general, and more effective functioning of several VMMs simultaneously, when running on single host.

(b) A VMM which allows to run guest operating systems in their own virtualization environment. In such an architecture, the VMM is the mechanism for virtualizing a guest OS environment. The Hypervisor is the mechanism for effective coexistence of several VMMs simultaneously, and the Hypervisor allows handling of necessary resources in the most effective manner for further use in virtualization engine (in a VMM).

Another example of a Hypervisor-based architecture is Open Bus Hypervisor (described in U.S. Provisional Patent Application No. 60/951,147, filed Jul. 20, 2007, incorporated herein by reference) which enables deeper integration with primary OS, handles hardware virtualization CPU features, maintains communication between different parts of virtualization environment, etc.

Xen multiplexes physical resources at the granularity of an entire operating system and provides performance isolation between them. It virtualizes all architectural features required by existing standard ABIs (application binary interface). Xen presents a Virtual Machine abstraction that is not identical to the underlying hardware—an approach which has been dubbed "paravirtualization". It does not require modifications to the guest operating system. Also, changes to the ABI are not required, and hence no modifications are required to guest applications.

Xen currently schedules domains according to a Borrowed Virtual Time (BVT) scheduling algorithm. This algorithm has a special mechanism for low-latency wake-up (or dispatch) of a domain when it receives an event. Fast dispatch minimizes the effects of virtualization on OS subsystems that are designed to run in a timely fashion.

VMware ESX Server is designed to multiplex hardware resources among the VMs. The requests from the applications supported by the guest OSs are scheduled by the using by the physical CPUs on the host OS. The guest OS is used by the Virtual CPU to run different processes. The VMM manages the VM's access to such hardware resources as CPU, memory, disk storage, network adapters, mouse, and keyboard.

When there is an attempt to use the busy shared resource, then this process must wait before the ESX Server can allocate the physical CPU to it. This situation may arise when multiple processes are trying to use the same physical CPU. The ESX Server scheduler manages access to the physical CPUs on the host system. Different processes must wait in the queue in a "ready-to-run" state before they can be scheduled on a CPU, which is known as "ready time". Also, there are maintenance activities that the operating system must perform, for example, when the guest OS is idle. Thus, even idle guest processes must be scheduled, consume CPU resources and accumulate ready time.

It should be noted that this invention is not limited to the types of VMMs described above, these are only examples where the present invention can be used.

Accordingly, there is a need in the art for a more efficient mechanism for scheduling of resources for a system where there are multiple Virtual Machines.

SUMMARY OF THE INVENTION

Accordingly, the present invention is related to symmetric multiprocessing with virtual CPUs and virtualization for symmetric multiprocessing that substantially obviates one or more of the disadvantages of the related art.

In one aspect, there is provided a system, method and computer program product, including a primary operating system (OS) having access to at least some hardware resources of the computer system. A Hypervisor controls a plurality of virtualization spaces and at least some of the remaining hardware resources. Each virtualization space maintains data of a corresponding instance of a Virtual Machine with a guest operating system running inside the Virtual Machine. Each Virtual Machine is associated with at least one virtual processor. A hyperswitch controlled by the Hypervisor starts and stops execution of the Virtual Machines. A scheduler dedicates a quantum of running time to each virtual processor. When the quantum is given to the Virtual Machine, the Hypervisor forces the hyperswitch to activate the Virtual Machine on its virtual processor.

In alternative embodiments, a Virtual CPU (VCPU) worker thread runs under the control of OS kernel and receives a quantum of running time from the primary OS. The VCPU worker thread functions include invoking the hyperswitch; verifying the virtualization space is allocated; and invoking an event-handler procedure. The VCPU worker thread runs inside a kernel of the primary OS, or inside a user process. The VCPU worker thread obtains a time quantum for its Virtual Machine. The Hypervisor manages a virtual CPU running in a context of a Virtual Machine. The host OS can be implemented as a primary OS that handles some of the hardware peripherals directly. The scheduler can run in the Hypervisor's space. The Hypervisor is loaded as a driver for the primary OS. The scheduler implements a scheduling policy that is any of: priority based, weight based, bursting limits, quarantine condition.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiments of the present invention, examples of which are illustrated in the accompanying drawings.

Figure 1:
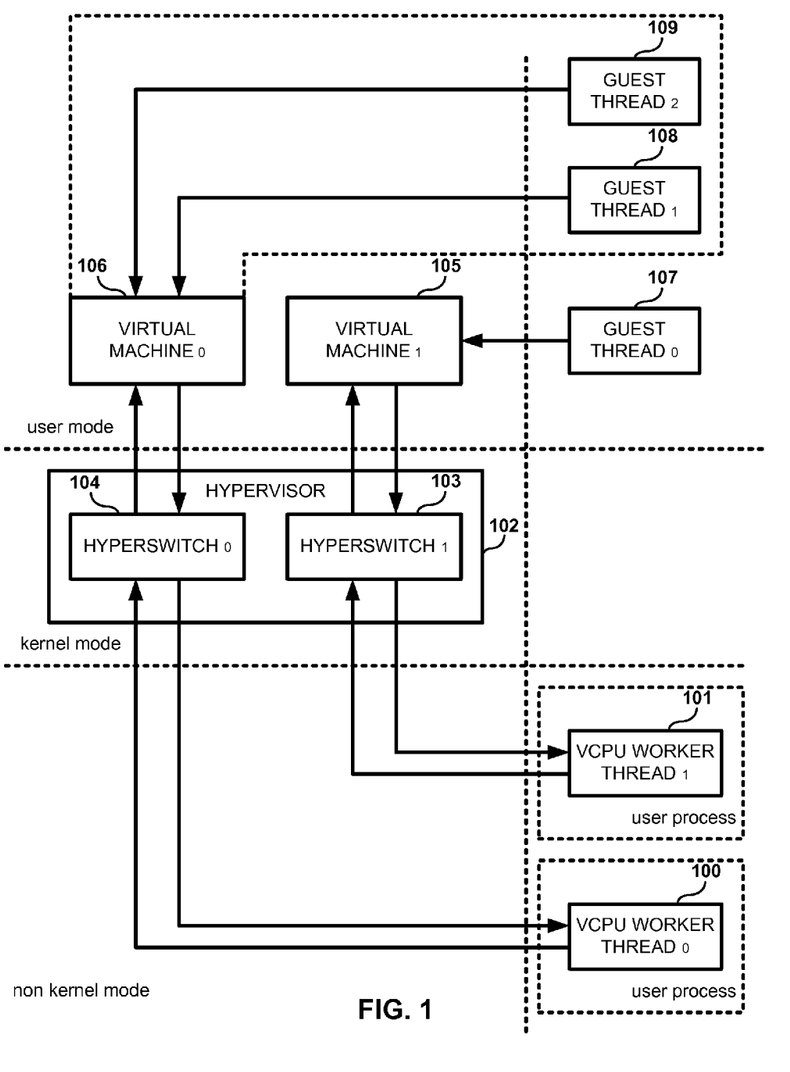
FIG. 1 illustrates a scheduling scheme based on a Hypervisor getting a time quantum for virtualization of guest OS code.

FIG. 1 illustrates an architecture of a computer system. A plurality of software applications execute as threads on a primary operating system (OS). The primary OS controls operations of scheduling and dispatching for the threads.

Virtual Machine$_0$ (VM$_0$) (105) and Virtual Machine$_1$ (VM$_1$) (106) run directly inside the primary OS. The Virtual Machines includes guest OS's, and the guest OS code should be completely separated from primary OS code. A virtualization space therefore needs to be created.

The primary OS supports the execution of guest Virtual Machines that provide a complete system environment. Each Virtual Machine works with the hardware of a physical computer. Thus, the Virtual Machine environments can support multiple user processes, such as guest thread$_0$ (107), guest thread$_1$ (108) and guest thread$_2$ (109).

Hypervisor technology can be used to create virtualization spaces. The Hypervisor (102) provides a mechanism to control context switches between the Virtual Machines and/or the Primary OS. The Hypervisor directly manages some of the host machine's communications. This allows the virtualization software to reduce overhead. Here, the Hypervisor is a thin layer of software that manages at least a part of the resources of the physical machine.

A hyperswitch is a layer of the Hypervisor that connects the primary OS threads and the virtual central processing unit (VCPU). The Hypervisor in FIG. 1 includes a hyperswitch$_0$ (103) and a hyperswitch$_1$ (104). For every Virtual Machine, there is a particular assigned hyperswitch.

In the case of thread organization with one VCPU to one thread relationship the Primary OS makes a decision which thread will work next. It may be VM thread or another thread of the another process. The time quantum is needed for the Virtual Machine code execution, which can be assigned by the primary OS and provided to the virtualization space. In this case, a virtual CPU (VCPU) worker thread gets the time quantum for the Virtual Machine execution. The VCPU worker thread (100) and the VCPU worker thread$_1$ (101) are shown in FIG. 1. With relation to primary OS, the VCPU worker thread is a thread that possesses equal rights with the primary OS, and executes in the primary OS kernel block. The VCPU worker thread (100 or 101) takes the time quantum for the Hypervisor switching functions.

The VCPU worker thread (100 or 101) calls the hyperswitch, and then time quantum can be given to another VCPU or even to another VM. On the other hand, the hyperswitch is primarily called by the VCPU worker thread (100, 101). As shown in FIG. 1 the VCPU worker thread$_0$ (100) corresponds to the hyperswitch$_0$ (104) and the VCPU worker thread$_1$ (101) corresponds to the hyperswitch$_1$ (104). Thus for each virtual process, there is a particular VCPU worker thread, i.e., a direct correlation between the VCPU worker threads and the Virtual Machines exists, for the purpose of the primary OS giving the time quantum for the particular virtual process execution.

Figure 2:
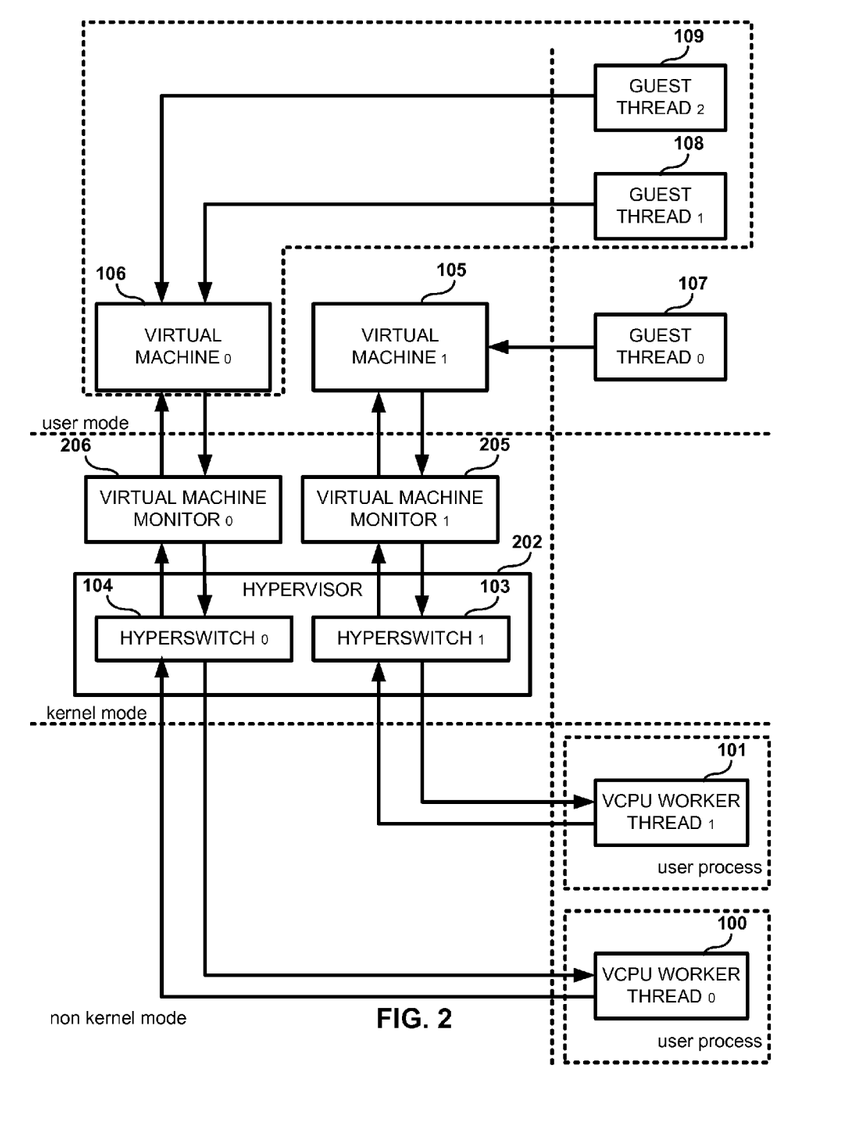
FIG. 2 illustrates a scheduling scheme based on hosted VMM architecture for getting a time quantum for virtualization of guest OS code.

FIG. 2 illustrates an architecture of a computer system, including a Virtual Machine Monitor$_0$ (206) and the Virtual Machine Monitor$_1$ (205). The Virtual Machine Monitor (VMM) is an intermediate layer between the Hypervisor (202) and the Virtual Machines: the Virtual Machine 105 and Virtual Machine 106. In this case, the Virtual Machine Monitor 205, 206 are responsible for the time quanta that are assigned to specific Virtual Machines.

For each Virtual Machine, there is at least one Virtual Machine Monitor instance, which will be referred to simply as "the VMM" in the text below. Thus, the requests or virtualization events generated by the Virtual Machines (105, 106) will be processed by the Virtual Machine Monitors (205, 206).

Figure 3:
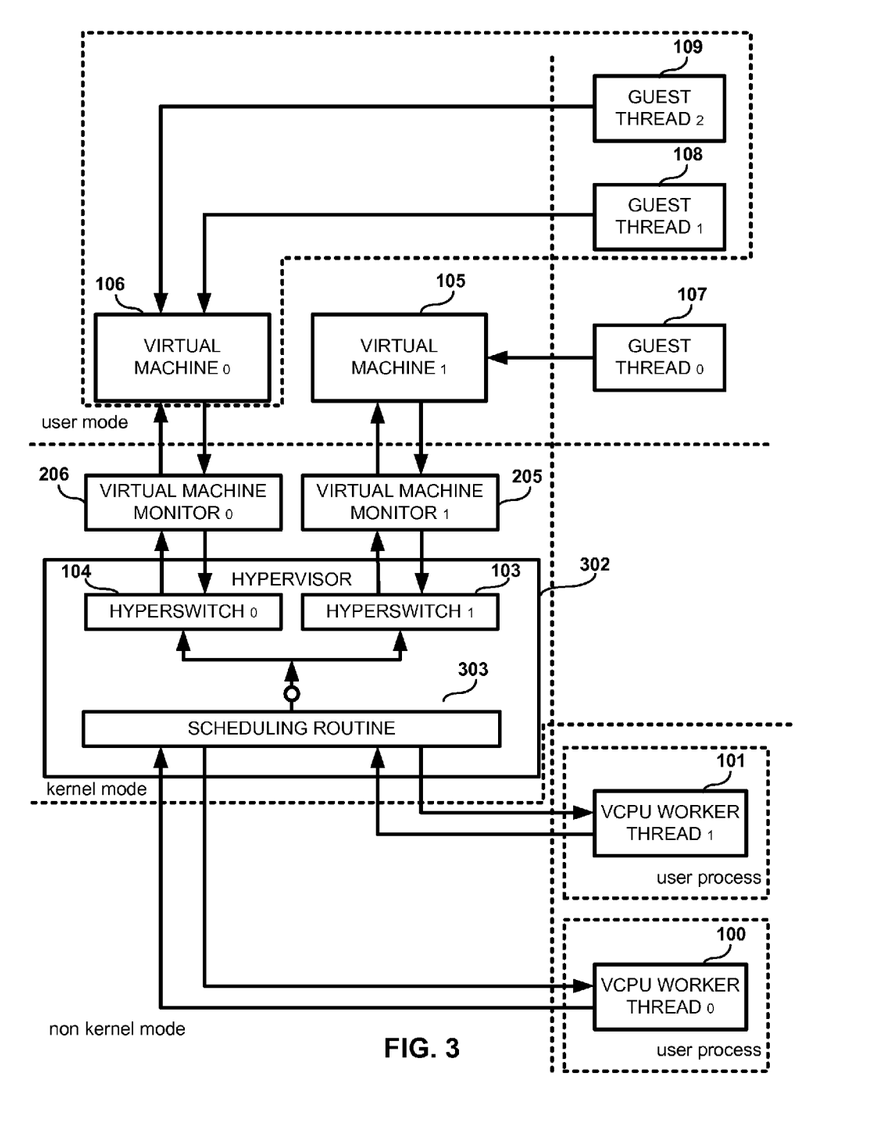
FIG. 3 illustrates a scheduling scheme of a virtualization system according to one embodiment of the present invention.

FIG. 3 is a flow diagram illustrating another exemplary architecture of a computer system according to the present invention. One problem of schemes illustrated in FIGS. 1-2 in that it is impossible to influence the priorities of the Hypervisor (302).

The threads of the Virtual Machine$_0$ (105) and the Virtual Machine$_1$ (106) have equal "rights", which is why the time quanta are equally distributed among the threads. With relation to primary OS, each Virtual Machine process has an equal time quantum value in the primary OS kernel block.

The architecture of the computer system that is shown in FIG. 1 is not an appropriate choice for the server environmental. The processor capacity balancing and the Hypervisor priority balancing are needed in a server application. An additional control layer is proposed to be used for the time quanta management. The additional scheduling control attribute will be used to control the allocation of processing time among the various competing threads in the Virtual Machines. Another scheduling policy is therefore required.

Instead of the architecture of direct selection between the VCPU worker threads (100, 101), the Hypervisor (302), the Virtual Machine Monitors (205, 206) and the Virtual Machines (105, 106), a new layer between the VCPU worker thread and the Virtual Machine is proposed.

This layer is preferably located in the Hypervisor 302 and runs an algorithm that allows the VCPU worker threads 100, 101 receives the time quantum without Virtual Machine intervention. This layer is called a scheduling routine (303). The scheduling routine 303 does not switch to a particular Virtual Machine. It looks ahead to a priority table according to the particular VCPU. The scheduling routine 303 defines which Virtual Machine should be executed at any given point in time. The hyperswitch redirects the received time quantum to the certain Virtual Machine Monitor. Therefore, it allows avoiding a situation when the primary OS resources are being utilized by one Virtual Machine, to the detriment of other VM's.

The Virtual Machines support multiple guest threads, such as guest thread$_0$ (107), guest thread$_1$ (108) and guest thread$_2$ (109). Thus for each virtual CPU, there is a particular VCPU worker thread, because this VCPU worker thread receives the quantum time from the primary OS. The primary OS gives the time quantum, via a virtual process, to the certain Virtual Machine execution.

Figure 4:
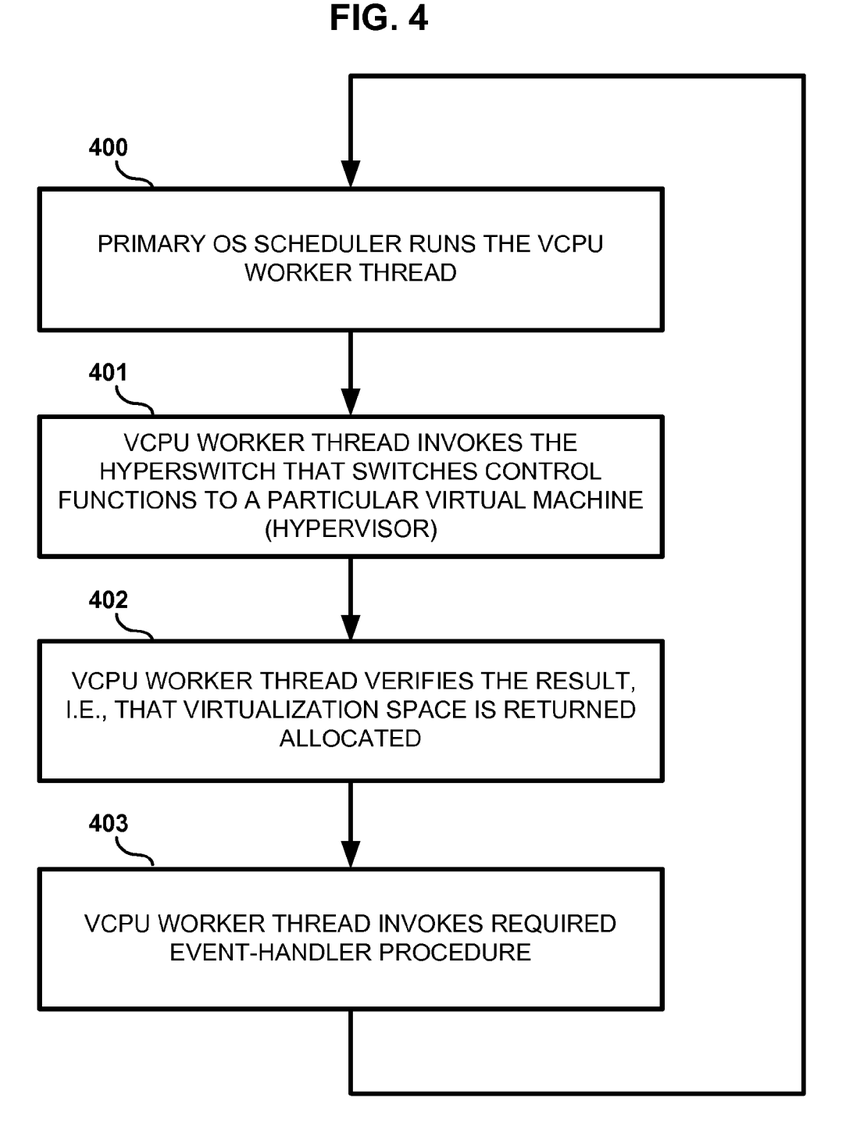
FIG. 4 illustrates major steps of a virtual CPU worker thread according to the present invention.

FIG. 4 is a flow chart illustrating basic virtual CPU worker thread steps, according to one embodiment of the present invention. The computational resources of the CPU are shared among all threads by the primary OS scheduler. At each time quantum, the CPU scheduler decides which process to run. As the VCPU worker thread is the process executing in the kernel the primary OS, scheduler of the primary OS gives it a CPU time quantum and runs it (400).

The algorithm includes invoking the hyperswitch that switches control functions to certain Virtual Machine (the Hypervisor) (step 401). The VCPU worker thread should then verify the result, that the virtualization space is returned (402). Then, the VCPU worker thread invokes the required event-handler procedure (403).

The VCPU worker thread allows getting the time quantum for the Virtual Machine execution. The primary function of the VCPU worker thread is invoking a context switching procedure.

If a hardware interrupt occurs, then the primary OS scheduler (which does not know about the relationship between the VMM and the VM(s)) can decide to switch to another user thread. This new thread may not be connected with the Virtual Machine processes, for example, it may be a MS WORD process running at the same time on the computer. Thus, next the time quantum will be given to the MS WORD process.

Figure 5:
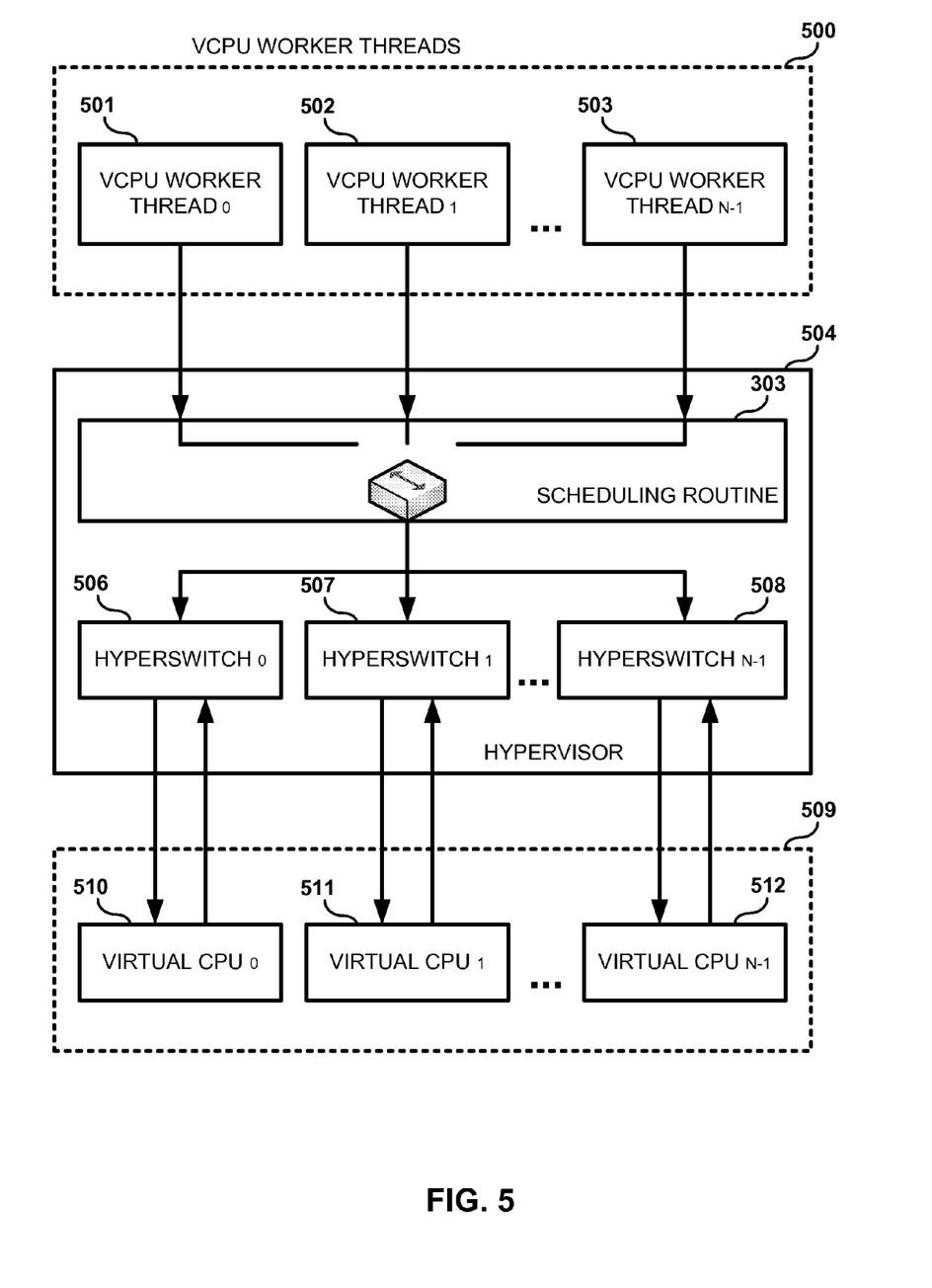
FIG. 5 is a flow diagram of a time quantum allocation algorithm according to the present invention.

FIG. 5 is a flow diagram showing example of quantum allocation algorithm according to one embodiment of the present invention. Some threads have equal rights. One of them may be the VCPU worker thread (500) that directs control functions to the Hypervisor (504). The VCPU worker thread$_0$ (501), VCPU worker thread$_1$ (502), . . . , VCPU worker thread$_{N-1}$ (503) are shown in FIG. 5. They correspond to virtual CPU's running inside the Virtual Machines, such as VCPU$_0$ (510), VCPU$_1$ (511), . . . , VCPU$_{N-1}$ (512). 509 and 509a represent a set of virtual CPUs that should receive a time quantum from the primary OS.

The VCPU worker thread$_0$ (510) corresponds to the hyperswitch$_0$ (506), the VCPU worker thread$_1$ (511) corresponds to the hyperswitch$_1$ (507) and so on. Also, an additional layer in the Hypervisor, the scheduling routine (303) schedules utilization of received real processor time quantum. The conformity of the threads in new architecture scheme is that the VCPU worker thread$_0$ (501) calls the scheduling routine (303). Then, the scheduling routine (303) looks-ahead to its control list and decides which Virtual Machine will be given the time quantum.

Figure 6:
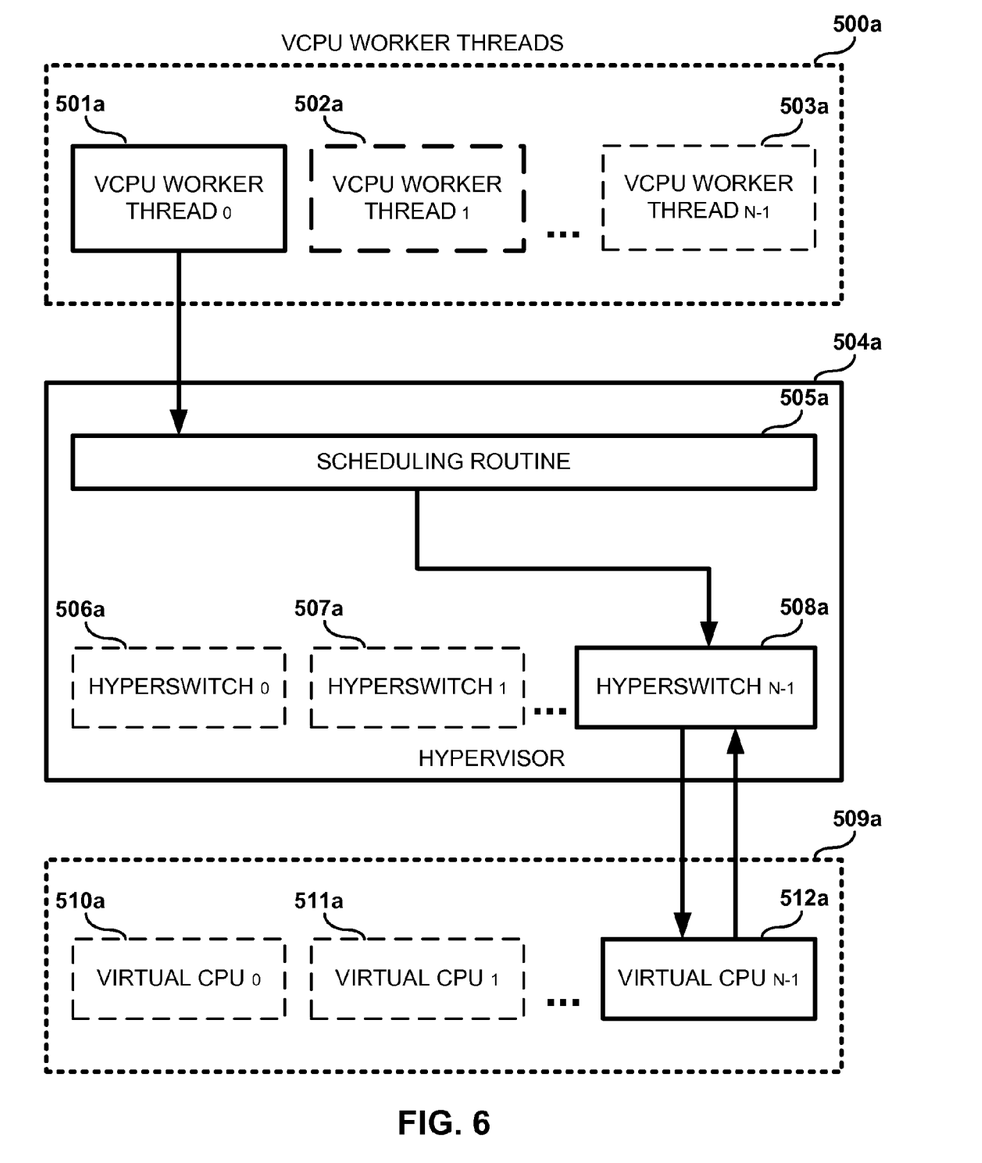
FIG. 6 is a flow diagram of an example of a quantum allocation algorithm according to the present invention.

FIG. 6 is a flow diagram showing an example of time quantum allocation algorithm according to one embodiment the present invention. For example, the VCPU$_0$ (510a) has already executed and has used up its time quantum, the VCPU$_1$ (511a) priority is not suitable for executing. But, VCPU$_{N-1}$ (512a) may be suitable for execution because of its priority level and gets the time quantum for execution. Thus, the particular VCPU is called for the VCPU worker thread that utilized the time quantum by the primary OS.

Figure 7:
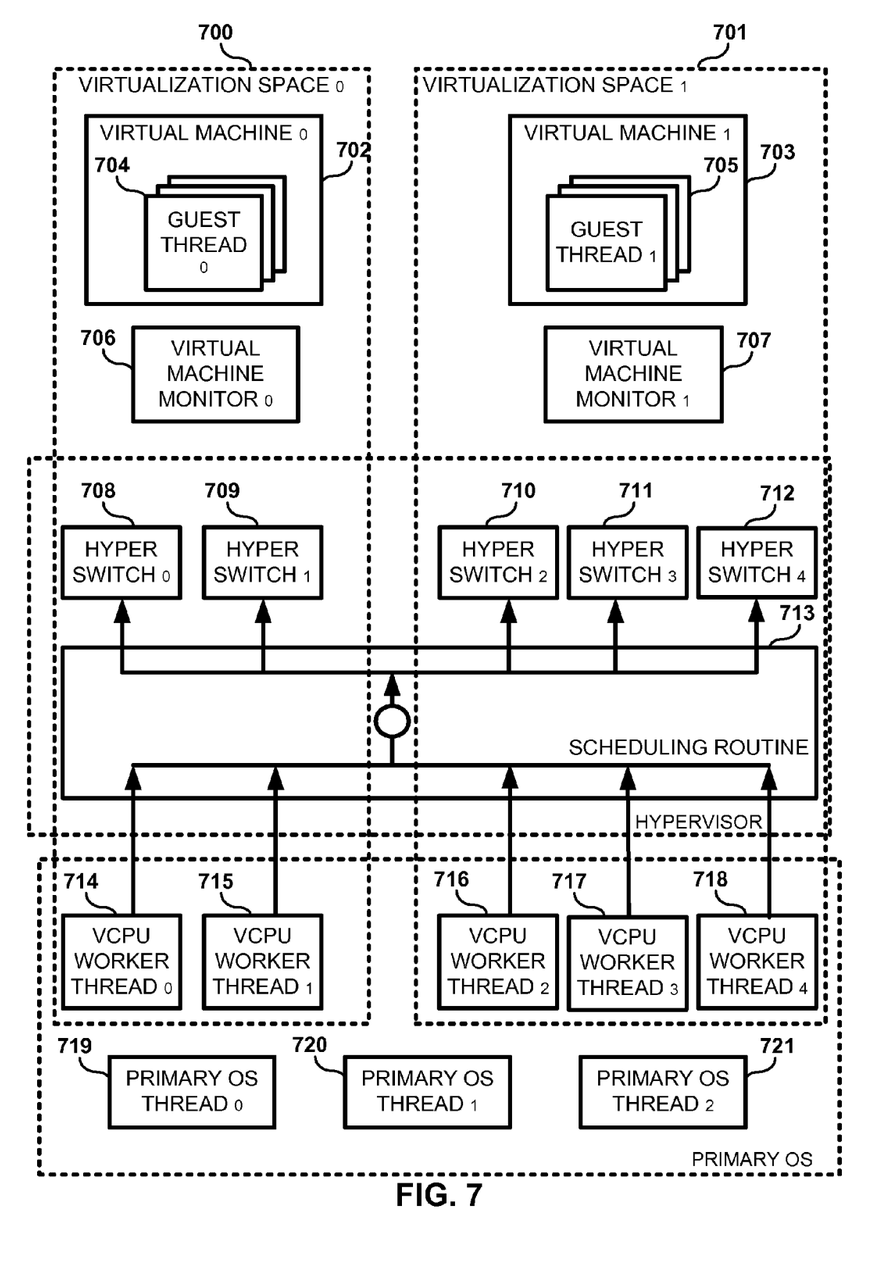
FIG. 7 is a block diagram of an example of an implementation according the present invention.

FIG. 7 is a block diagram showing example of an implementation according the present invention. The virtualization space$_0$ (700) and the virtualization space$_1$ (701) are shown in FIG. 7. A virtualization space is needed for creating the Virtual Machine. For every Virtual Machine, there is usually a particular virtualization space. The Virtual Machine$_0$ (702) and the Virtual Machine$_1$ (703) are executed in their own virtualization spaces.

The Virtual Machines (702, 703) run on a multi-processor system. Thus, the Virtual Machine$_0$ (702) executes on a two-processor system, the Virtual Machine$_1$ (703) executes on a three-processor system. The VCPU worker threads function in the primary OS. Also, the primary OS executes several primary OS threads: primary OS thread$_0$ (719), primary OS thread$_1$ (720) and primary OS thread$_2$ (721). The VCPU worker thread$_0$ (714) and VCPU worker thread$_1$ (715) correspond to the virtualization space$_0$ (700). The VCPU worker thread$_2$ (716), the VCPU worker thread$_3$ (717) and the VCPU worker thread$_4$ (718) correspond to the virtualization space$_1$ (701). The scheduling routine layer (713) is responsible for the time quantum allocation.

Typically, there is a selection mechanism of the Virtual Machine that is needed to be implemented at the given time quantum—i.e., "if I receive a time quantum, I should select a particular VM to utilize this time quantum." This mechanism manages the time quanta using a priority table. It gives an opportunity to select a particular Virtual Machine and waits for the quantum time that is assigned to the selected Virtual Machine. Therefore, the time quantum is given to the Virtual Machine regardless of whether or not it is needed. The Virtual Machine might not perform any activities while waiting for the time quantum, i.e., the Virtual Machine is not executing any critical tasks. In this situation, the Virtual Machine may execute the programmed instructions, for example, a HALT instruction. This instruction is implemented while the hardware interrupts occur.

In the present invention, the selection mechanism of the Virtual Machine can be more flexible. With the relation to primary OS, the VM appears as if it is a process that is executed by the primary OS rules. If the priority balancing is changed, the time quanta adjustment is concerned only with more efficient allocation of the time quanta, i.e., if the primary OS gives the minimal time quantum, the use of this time quantum will be dedicated to the Hypervisor's priority balancing rules or to the asynchronous events processing subroutines that are required for maximum speed in processing.

Here, a scheduling routine layer 713 uses virtual symmetric multiprocessing (VSMP). This technology allows to have several virtual processors in the host OS in the presence of the Hyper-Threading Technology and several physical processor cores.

The Hyper-Threading Technology permits simulation of two virtual processors within the bounds of the one physical processor using symmetric multiprocessing technology (SMP). This architecture also can be implemented with a system of several processors, which can be logical or virtual processors.

VSMP (Virtual SMP) Technology is implemented where one Virtual Machine and one operating system can function with several virtual processors. The virtual processor executes the VCPU worker thread, and the VCPU can have several VCPU worker threads. The proposed system quantizes the time between the threads and runs in parallel with these threads. Thus, if several real threads are running, the current system will execute parallel real threads. In this case, the virtual processors address all time quanta distribution problems. Each virtual processor (VCPU) is a separate VCPU worker thread, for purposes of time slicing it is a separate primary OS thread.

Figure 8:
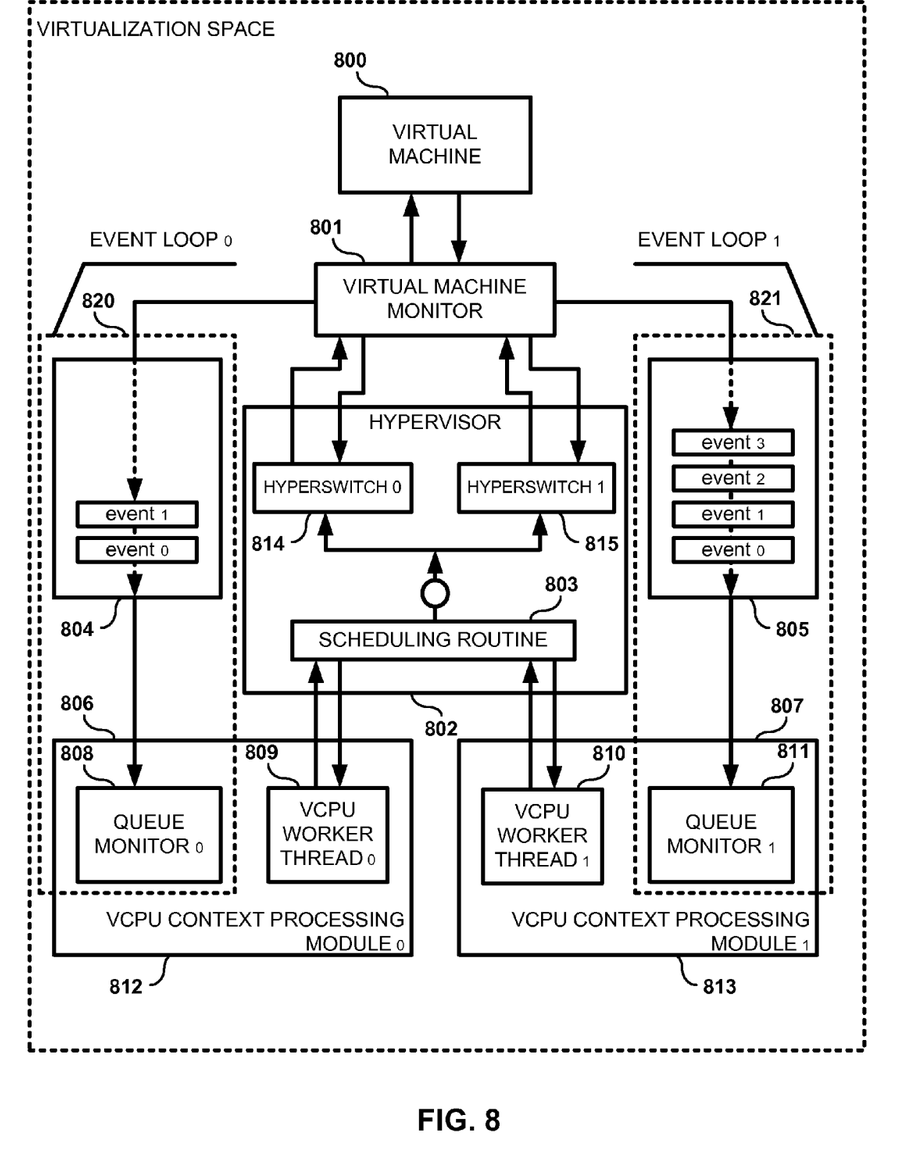
FIG. 8 is a block diagram showing an asynchronous architecture of the computing system according to the present invention included the scheduling routine layer.

FIG. 8 is a block diagram showing asynchronous scheme architecture according to the present invention. As shown in FIG. 8 the asynchronous architecture of the computing system includes the scheduling routine layer (803). The scheduling routine 803 is located in the Hypervisor (802).

Since the VCPU worker thread acquires the quantum time for a particular Virtual Machine, the scheduling routine 803 will check the requests from the Virtual Machine before their execution. The scheduling routine 803 aims checking the implementation of the requests by particular VCPU worker thread.

The VCPU worker thread$_0$ (809) and VCPU worker thread$_1$ (810) are shown in FIG. 8. The VCPU context processing module$_0$ (812) and the VCPU context processing module$_1$ (813) check the requests from the Virtual Machine (800). The VCPU context processing module has two main elements: the VCPU worker thread and the event loop construct 820, 821. The VCPU worker thread and the event loop don't have any identical functions implemented in the VCPU context processing module. The VCPU worker thread gives the time quantum to correspondent VCPU for VM execution. The event loop performs communication function between user process and VM.

The event loop constructs 820, 821 also have two main elements: an event queue and the special thread named by the queue monitor. Their functions are closely connected and are performed sequentially.

The VM context processing module includes an event queue$_0$ (804), an event queue, (805) a queue monitor$_0$ (808), and a queue monitor$_1$ (811). In FIG. 8 the event queues are shown as one directional queue but they can be also bidirectional queues.

The events come from the Virtual Machine Monitor (801) to the event queue (804, 805). For every event queue, there is a certain VCPU context processing module (812, 813). The queue monitor runs a special function that handles the requests from the Virtual Machine (800). If there is an event$_0$ in the event queue, the queue monitor takes this event and virtualizes it. If the event queue is empty, the queue monitor will wait until the next event.

In the present case, the OS maintains the multithreading. This means that the OS can carry on multiple processes simultaneously. A process can be divided into many separate pieces, so that the OS has more options with distributing CPU cycles. More threads give the OS more options on how it will execute instructions. It can let some threads receive more CPU time than others, offload threads to additional processors, or terminate a thread's execution.

One important issue is the efficiency of utilizing the shared resources of the primary OS. This problem appears when more than one thread needs to access a single memory cell or other resource. The synchronization mechanism avoids conflicts between multiple instructions. Without a careful access control, the thread activity may cause problems. One of the problematic situations is when the instruction reads data from the memory, analyzes the data and decides to update the memory, but at the same time this value has been changed by another VCPU.

Locks are a fundamental synchronization mechanism provided by the threads running concurrently. At any time, a lock can be held by a single instruction or by no instruction at all. If an instruction attempts to hold a lock that's already held by some other instruction, execution of the first instruction is halted until the lock is released. Locks are typically used to synchronize access to shared resources. For each shared resource, a Lock object is created.

The standard lock object does not care which instruction is currently holding the lock; if the lock is held, any instruction that attempts to acquire the lock will be blocked, even if the same instruction is already holding the lock. In this case, the lock object is used to block the access to the memory location.

Figure 9:
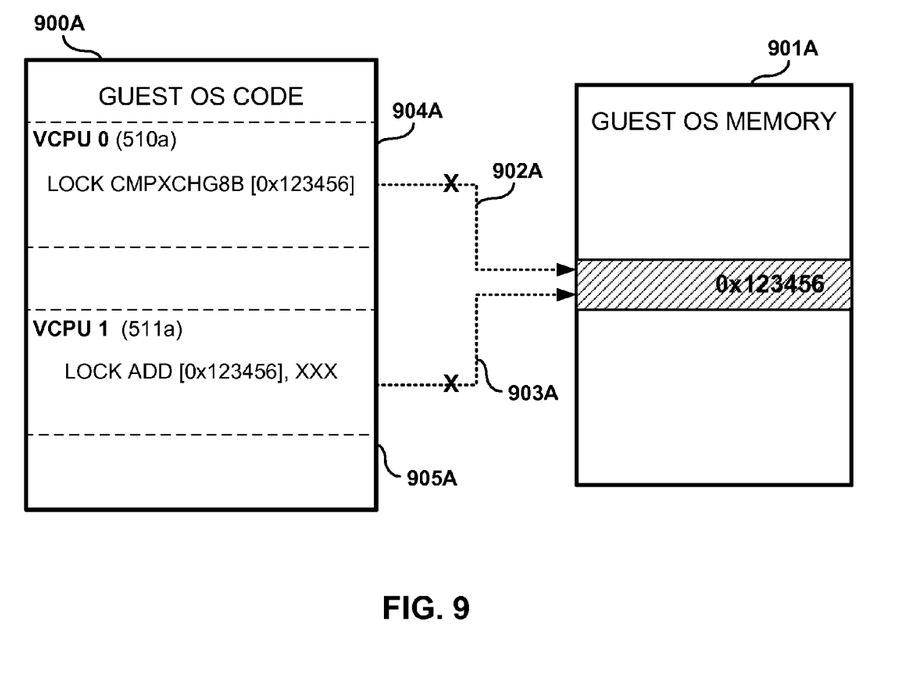
FIG. 9 is a flow diagram showing the thread synchronization mechanism according to the present invention.

FIG. 9 illustrates operation with the prefix "Lock" and can execute with the following commands in the guest OS code (900): ADD (905) and CMPXCHG (904). The VCPU$_0$ (510a) and the VCPU$_1$ (511a) run on the multiple CPUs. The VCPU$_0$ (510a) executes one of the instructions, for example ADD (905) and the VCPU$_1$ (511a) executes the instruction CMPXCHG (904). This instruction is performed as an atomic operation that performs a comparison of the specified values and exchanges the values based on the outcome of the comparison. The function prevents more than one thread from using the same variable simultaneously. The function performs an atomic comparison of the Destination value with the Comperand value. If the Destination value is equal to the Comperand value, the Exchange value is stored in the address specified by Destination. Otherwise, no operation is performed.

Locks typically require hardware support for efficient implementation. This usually takes the form of one or more atomic instructions such as "test-and-set", "fetch-and-add" or "compare-and-swap." These instructions allow a single process to test if the lock is free, and, if free, acquire the lock in a single atomic operation. When the code is being executed in a virtualized environment, hardware support is not always available for that contains Lock access instructions or instructions with the Lock prefix. In this case, the instruction must be handled in software. To execute the locking of a memory cell that a particular process is addressing, first, the data in the memory cell is read, the new data value is calculated, according to the opcodes of the process at issue, but the new data value is not written to the memory cell by the native cell, since it is possible that another process has accessed that memory cell in the meantime.

Then, if it is possible to finish execution of the instruction, the memory cell is updated. This can be done using an atomic operation, such as cmpxchg, that is executed as a single operation with only two possible outcomes: success or failure. Also, the atomic operation cannot be interrupted until it is completed. The atomic operation permits verification and writing of the new data value to the memory cell in a "continuous" regime. During execution of the cmpxchg command, the processor bus (of the processor that is executing this instruction) will block that memory cell, and a different process cannot address that memory cell. Due to the atomicity, exclusive access of one thread is guaranteed, and the atomicity guarantees that the entire instruction is executed without interruption.

For example:

Cmpxchg [memory cell address] [initial value] [new data value]

When the instruction is executed, the memory cell initial value is compared to the current data value—i.e., the previously read initial value is compared to the data value that is currently stored in the memory cell, to test for whether it has changed.

If the value has not changed, the memory cell value receives a new value, and the flag of successful execution (ZF=1) is set, and the code continues executing.

If the value in the memory cell has changed during the execution of the code, the flag is set as ZF=0. In this case, the memory cell is read again, and a rollback is performed, to the original instruction with the Lock prefix. If necessary, the memory cell value is tested repeatedly, until the process fragment at issue successfully gains control over the memory cell.

The instructions refer to the different memory cells in the guest OS memory (901), however some threads may need to access a single address space of the physical memory. Thus, the access of a single memory cell is implemented by different threads with different commands. In this case, the accesses (902) from the commands are write (or read) access to a protected memory cell.

VCPU$_0$: cmpxchg [xxx]
VCPU$_1$: add [0x123456], 0x1

During this operation, access to the current memory location is blocked at a memory bus level.

Hence, one of the commands may hold the lock until it is released. If the lock is held by the instruction the next instruction is not able to hold the lock and the VCPU has to wait. Thus, the mechanism of the lock objects synchronizes the accesses to the physical memory.

Figure 10:
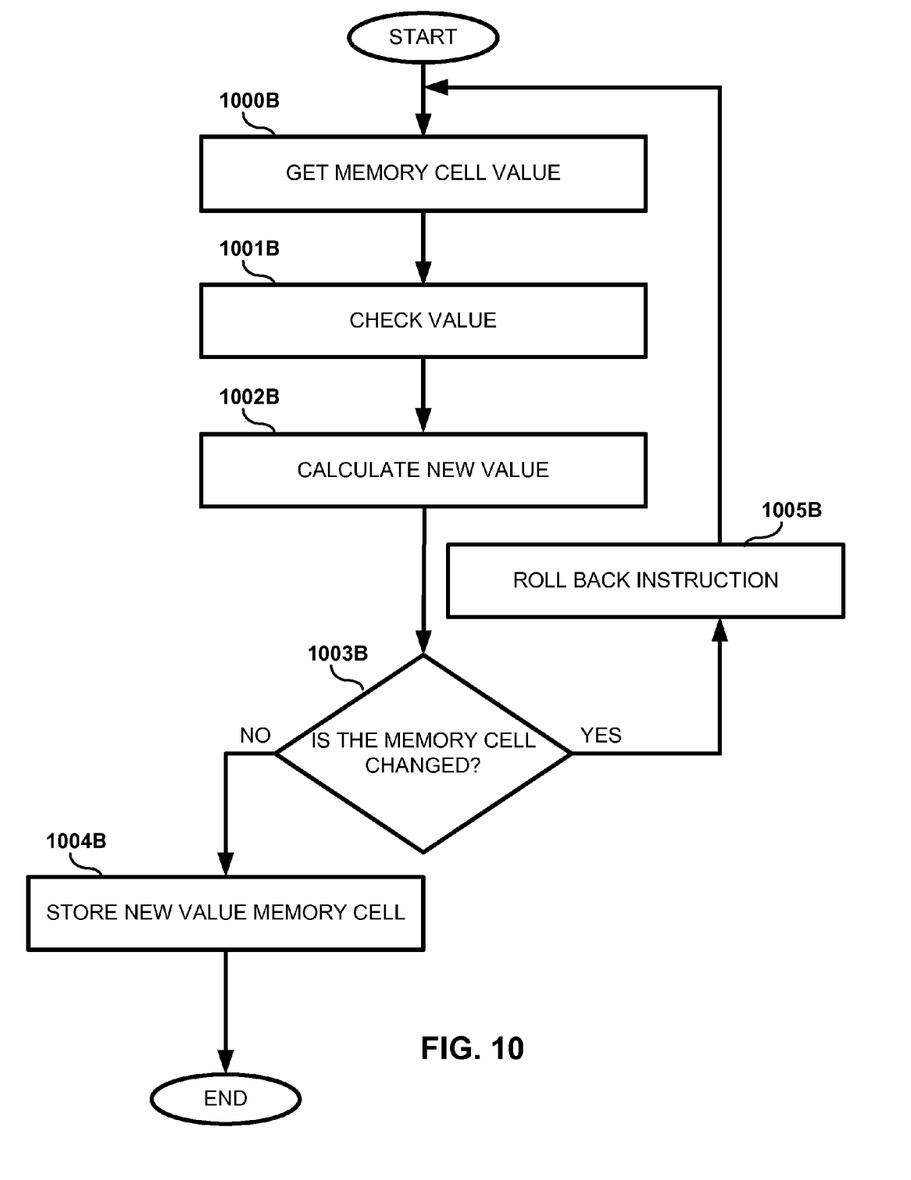
FIG. 10 is a flow chart illustrating the CPU emulation routine that responds to memory cell access.

FIG. 10 illustrates the CPU emulation routine that handles access to a memory cell. The access that is directed to protected memory cell is emulated with the CPU emulation routine. The value is received during the memory cell access in the guest OS memory (step 1000). After the CPU emulation routine checks the value (step 1001), a new value calculation takes place (step 1002). So, if the memory cell is changed during the calculation (step 1003), another attempt is required. Rolling back of instruction is performed (step 1005) and again the memory cell value is read in the guest OS memory. If the memory cell is not changed then this memory cell is updated by storing a new value in the memory cell (step 1004B). Steps 1003, 1004 are implemented as atomic (uninterruptable) operations The results of atomic operations appears as a whole entity, or does not appear at all in memory.

Figure 11:
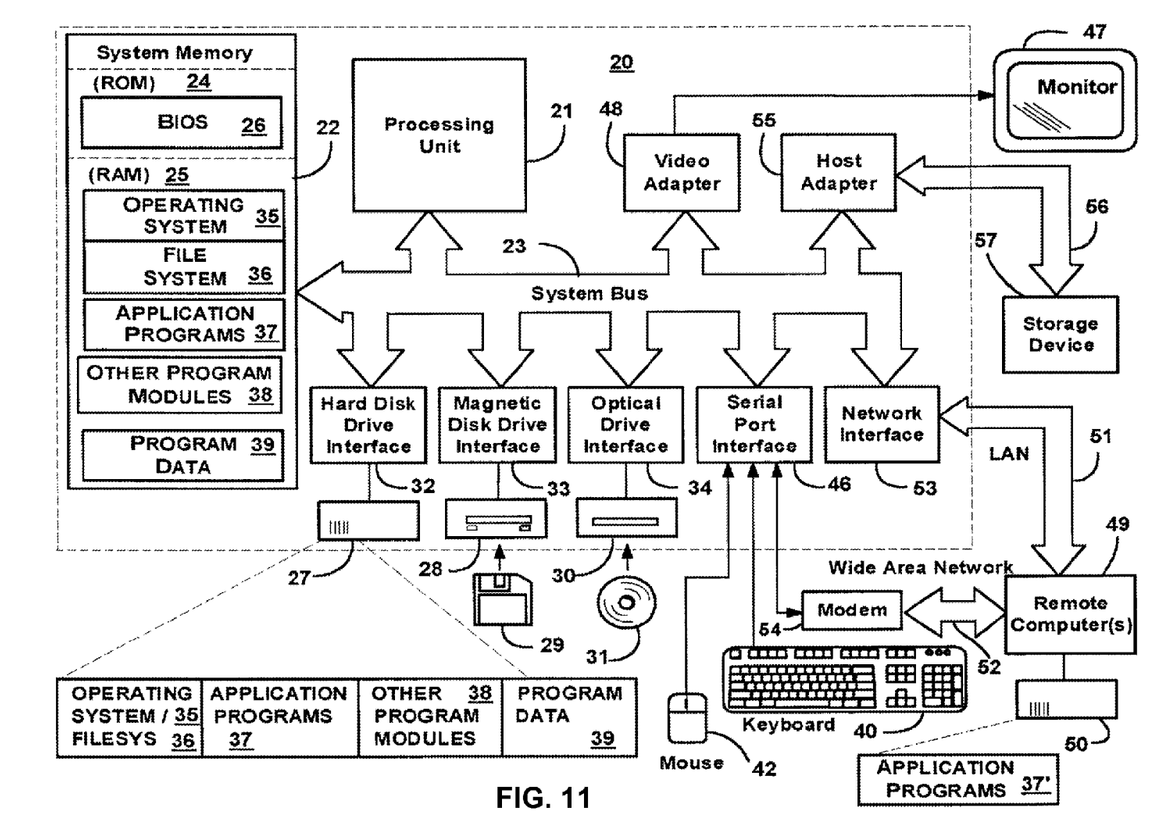
FIG. 11 illustrates an exemplary computer system on which an Open Bus Hypervisor can be implemented.

With reference to FIG. 11, an exemplary computer system, where the Open Bus Hypervisor can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer system comprising:
a processor;
one or more deprivileged Virtual Machines (VM), wherein each of the one or more deprivileged VMs have a guest operating system, and are running under control of a corresponding Virtual Machine Monitor (VMM);
each of the corresponding VMM is controlled by a corresponding hyperswitch inside a Hypervisor, wherein the Hypervisor controls a plurality of virtualization spaces, each of the plurality of virtualization spaces contain the corresponding VMM;
a primary operating system (OS) having access to at least some hardware resources of the computer system and the Hypervisor controlling at least some of the remaining hardware resources;
each of the virtualization space maintaining data of the corresponding instance of the deprivileged VM and each of the VM executing atomic and non-atomic instructions and being associated with at least one virtual processor that runs under control of its corresponding VMM;
the Hypervisor containing a scheduling routine and one or more hyperswitches, wherein each of the one or more hyperswitches correspond to each of the one or more VMs;
a Virtual CPU (VCPU) worker thread that runs under control of the primary OS and receives a time quantum from the primary OS without intervention from the one or more VMs, wherein the time quantum is a duration of time that the VM can execute;
upon receiving the time quantum, the VCPU calls the scheduling routine inside the Hypervisor, wherein the scheduling routine upon receiving the call from the VCPU, looks ahead to a control list and determines a VM from the one or more VMs that will be executed during the duration of the time quantum using a scheduling policy that is any of: priority based, weight based, bursting limit or quarantine condition;
the scheduling routine invokes the corresponding hyperswitch of the determined VM;
the corresponding hyperswitch invoked by the scheduling routine redirects the time quantum to the VMM that controls the VM;
the VM starts execution under the control of the VMM for the duration of the time quantum,
wherein the VM executes atomic and non-atomic instructions;

wherein for each executed non-atomic instruction, calculates a new value and updates a random access memory location, the Hypervisor checks if an original value in the random access memory location had changed during execution of the non-atomic instruction, and only when the original value has changed, the non-atomic instruction is rolled back to recalculate the new value using the changed value and then stores it in the random access memory location, and does not recalculate the new value when the original value has not changed.

2. The computer system of claim 1, wherein the VCPU functions include:
    invoking the hyperswitch;
    verifying the virtualization space is allocated; and
    invoking an event-handler procedure.

3. The computer system of claim 1, wherein the VCPU runs inside a kernel of the primary OS.

4. The computer system of claim 1, wherein the VCPU obtains the time quantum for its VM.

5. The computer system of claim 1, wherein the Hypervisor manages the virtual processor running in a context of the VM.

6. The computer system of claim 1, wherein the computer system comprises a host OS that is implemented as the primary OS that handles some of the hardware resources directly.

7. The computer system of claim 1, wherein the computer system comprises the scheduling routine runs in the Hypervisor's space.

8. The computer system of claim 1, wherein the Hypervisor is loaded as a driver for the primary OS.

9. A virtualization method comprising:
    instantiating one or more virtualization spaces, wherein each of the one or more virtualization space include a deprivileged virtual machine (VM) that has a guest operating system, and the one or more virtualization spaces are running under control of a corresponding Virtual Machine Monitor (VMM),
    wherein each of the corresponding VMM is controlled by a corresponding hyperswitch inside a Hypervisor, and wherein the Hypervisor controls the one or more virtualization spaces, each of the one or more virtualization spaces contain the corresponding VMM;
    a primary operating system (OS) having access to at least some hardware resources of the computer system and the Hypervisor controlling at least some of the remaining hardware resources;
    each of the virtualization space maintaining data of the corresponding instance of the deprivileged Virtual Machine (VM) and each of the VM executing atomic and non-atomic instructions and being associated with at least one virtual processor that runs under control of its corresponding VMM;
    the Hypervisor containing a scheduling routine and one or more hyperswitches, wherein each of the one or more hyperswitches correspond to each of the one or more VMs;
    a Virtual CPU (VCPU) worker thread that runs under control of the primary OS and receives a time quantum from the primary OS without intervention from the one or more VMs, wherein the time quantum is a duration of time that the VM can execute;
    upon receiving the time quantum, the VCPU calls the scheduling routine inside the Hypervisor, wherein the scheduling routine upon receiving the call from the VCPU, looks ahead to a control list and determines a VM from the one or more VMs that will be executed during the duration of the time quantum using a scheduling policy that is any of: priority based, weight based, bursting limit or quarantine condition;
    invoking, by the scheduling routine, the corresponding hyperswitch of the determined VM;
    redirecting the time quantum, by the invoked hyperswitch, to the VMM that controls the VM;
    starting execution of the VM under VMM control for the duration of the time quantum,
    wherein the VM starts executing atomic and non-atomic instructions;
    for each executed non-atomic instruction, calculating a new value and updating a random access memory location,
    checking if an original value in the random access memory location had changed during execution of the non-atomic instruction, and only when the original value has changed, the non-atomic instruction is rolled back to recalculate the new value using the changed value and then stores it in the random access memory location, and the new value is not recalculated when the original value has not changed.

10. The virtualization method of claim 9, wherein the VCPU:
    invokes the hyperswitch;
    verifies that the virtualization space is allocated; and
    invokes an event-handler procedure.

11. The virtualization method of claim 9, wherein the VCPU obtains the time quantum for its VM.

12. The virtualization method of claim 9, wherein the scheduling routine runs in the Hypervisor's space.

13. The virtualization method of claim 9, wherein the Hypervisor is loaded as a driver for the primary OS.

14. A non-transitory computer useable recording medium having computer program logic stored thereon for executing on a processor, the computer program logic comprising computer program code for implementing the steps of:
    instantiating one or more virtualization spaces, wherein each of the one or more virtualization space include a deprivileged virtual machine (VM) that has a guest operating system, and the one or more virtualization spaces are running under control of a corresponding Virtual Machine Monitor (VMM),
    wherein each of the corresponding VMM is controlled by a corresponding hyperswitch inside a Hypervisor, and wherein the Hypervisor controls the one or more virtualization spaces, each of the one or more virtualization spaces contain the corresponding VMM;
    a primary operating system (OS) having access to at least some hardware resources of the computer system and the Hypervisor controlling at least some of the remaining hardware resources;
    each of the virtualization space maintaining data of the corresponding instance of the deprivileged Virtual Machine (VM) and each of the VM executing atomic and non-atomic instructions and being associated with at least one virtual processor that runs under control of its corresponding VMM;
    the Hypervisor containing a scheduling routine and one or more hyperswitches, wherein each of the one or more hyperswitches correspond to each of the one or more VMs;
    a Virtual CPU (VCPU) worker thread that runs under control of the primary OS and receives a time quantum from the primary OS without intervention from the one or more VMs, wherein the time quantum is a duration of time that the VM can execute;

upon receiving the time quantum, the VCPU calls the scheduling routine inside the Hypervisor, wherein the scheduling routine upon receiving the call from the VCPU, looks ahead to a control list and determines a VM from the one or more VMs that will be executed during the duration of the time quantum using a scheduling policy that is any of: priority based, weight based, bursting limit or quarantine condition;

invoking, by the scheduling routine, the corresponding hyperswitch of the determined VM;

redirecting the time quantum, by the invoked hyperswitch, to the VMM that controls the VM;

starting execution of the VM under VMM control for the duration of the time quantum, wherein the VM starts executing atomic and non-atomic instructions;

for each executed non-atomic instruction, calculating a new value and updating a random access memory location, checking if an original value in the random access memory location had changed during execution of the non-atomic instruction, and only when the original value has changed, the non-atomic instruction is rolled back to recalculate the new value using the changed value and then stores it in the random access memory location, and the new value is not recalculated when the original value has not changed.

15. The computer system of claim 1, wherein the Hypervisor distributes multiple processes to multiple virtual processors.

16. The computer system of claim 1, wherein the look-ahead control list is maintained as a priority table.

17. The computer system of claim 1, wherein the scheduling routine uses virtual symmetric multiprocessing (VSMP) to enable multiple virtual processors in the primary OS and multiple physical processor cores.

18. The computer system of claim 1, wherein the scheduling routine checks requests from the VMs before their execution.

19. The computer system of claim 1, wherein the scheduling routine allocates more CPU time to some threads than to others.

20. The computer system of claim 1, wherein the scheduling routine offloads threads to additional processors.

* * * * *